Dec. 4, 1962 S. H. BINGHAM 3,066,617
LIGHT WEIGHT RAPID TRANSIT TRUCK
Filed March 24, 1960 2 Sheets-Sheet 1
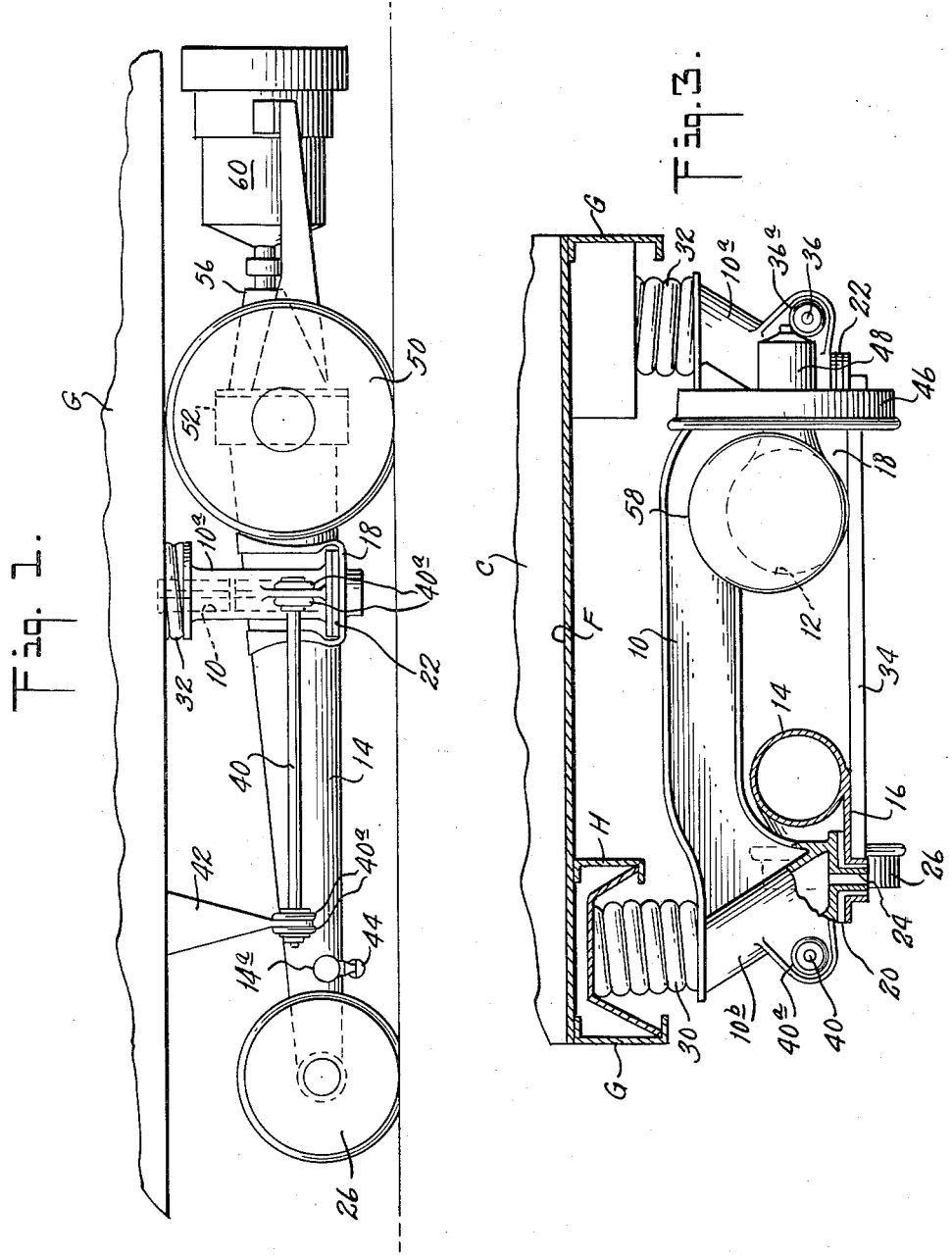
INVENTOR.
SIDNEY H. BINGHAM
BY
*Darby & Darby*
ATTORNEYS

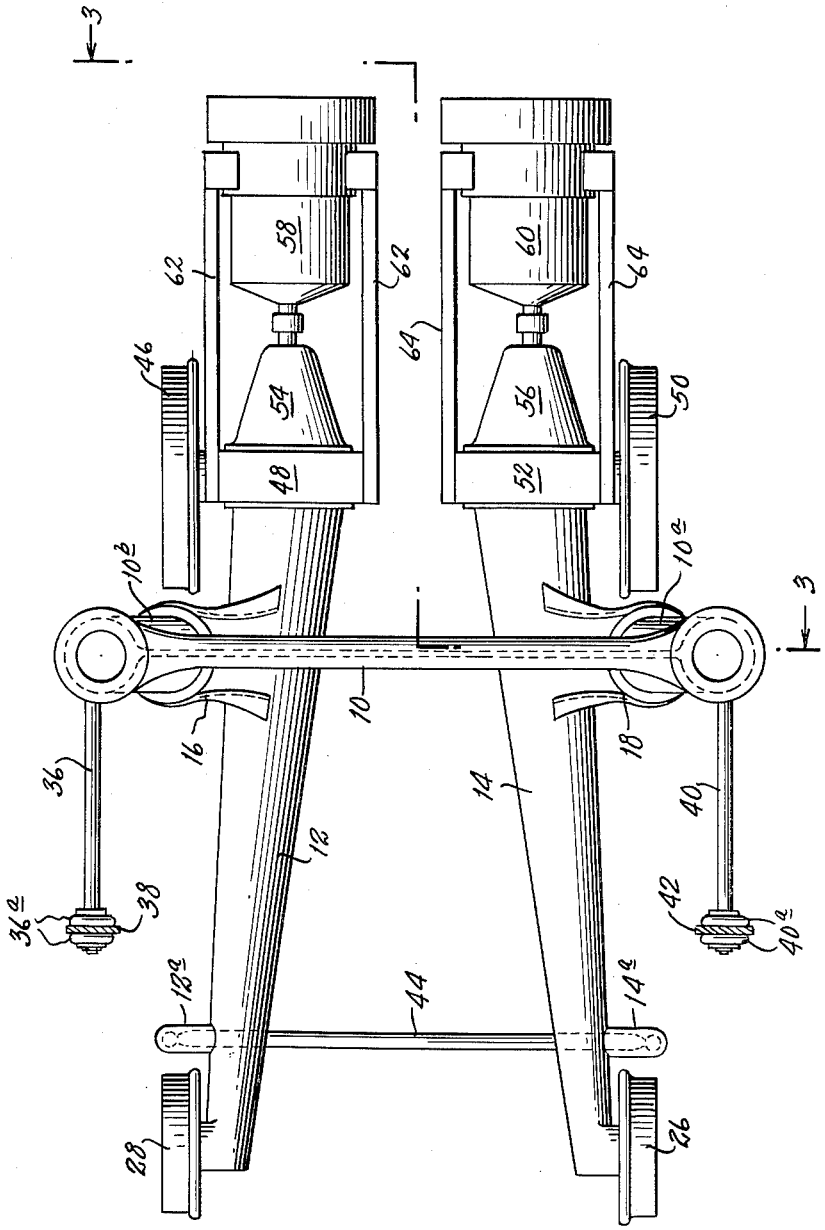

United States Patent Office 3,066,617
Patented Dec. 4, 1962

3,066,617
LIGHT WEIGHT RAPID TRANSIT TRUCK
Sidney H. Bingham, 109 E. 35th St., New York 16, N.Y.
Filed Mar. 24, 1960, Ser. No. 17,413
9 Claims. (Cl. 105—179)

This invention relates to improvements in vehicle trucks and in their combination with car structures.

The broad object of this invention is to provide a structurally simplified light weight transit vehicle truck with resultant savings in cost of manufacture.

One object of this invention is to provide a vehicle truck consisting mainly of a pair of independently or relatively movable side frame members guided in substantial parallelism by means of the rails and pivotally cross-connected with a bolster on which the car body is mounted.

Another object of the invention is to provide means for interconnecting the bolster ends with the car body to absorb longitudinal forces.

Still another object of the invention is to provide in such a combination a bolster of H-shape in cross-section to minimize the torsion stresses which develop as the result of uneven leveling of the truck.

An important object of the invention is to provide in combination with a pair of independent side frame members cross-connected to the bolster, driving and guiding wheels journaled on the side frame members fore and aft at the ends of the bolster with the driving wheels closer to the bolster ends than the guide wheels so that the wheels are unequally loaded.

Still another object of the invention in view of the foregoing object is the insurance of higher acceleration ability of vehicles employing such trucks because of the high weight loading on the drive wheels, thereby avoiding the need for four wheel drive.

A still more specific object of the invention is to provide a novel method of mounting the drive motors on the truck so as to increase the loading on the driving wheels.

A more general object of the invention is to provide a novel truck assembly which insures better truck stability and rail guidance.

Other and more detailed objects of the invention will be apparent from the following detail description of the embodiment thereof selected for illustration in the accompanying drawings.

In the drawings,

FIGURE 1 is a side elevational view of the truck of this invention shown in association with a car structure shown in part and diagrammatically;

FIGURE 2 is a top plan view of the truck assembly with the car structure removed;

FIGURE 3 is a righthand end elevational view of the truck assembly with respect to the righthand side and a cross-sectional view with respect to the lefthand side, with some parts broken away.

As illustrated the structure of this invention includes a pair of generally parallel longitudinally extending side frame members 12 and 14 which in the form illustrated are tubular and of generally increasing diameter from the front end towards the rear. These side frame members are respectively provided with lateral brackets 16 and 18 extending outwardly therefrom. Cross-connecting the side frame members is a single bolster 10 of H-shape, in cross-section having a pair of brackets 10ª and 10ᵇ integral with the respective ends thereof. As shown, these brackets are also tubular and extend vertically in an upward direction, as is clear from FIG. 3.

The upper common ends of the bolster and its brackets form ledges on which the lower ends of the car structure sustaining springs 30 and 32 rest. The car structure, as illustrated, comprises a body or platform C of any suitable construction having a floor F resting upon a girder framework G. At the points of contact with the suspension springs, housings H are provided in which seats for the upper ends of these springs are housed.

The lower ends of the brackets 10ª and 10ᵇ are provided with tubular extensions, one of which is shown at 24 in FIG. 3, which are journaled in load bearing turning plates 20 complementarily shaped and mounted in the brackets 16 and 18. This arrangement permits relative limited pivotal movement of the side frame members with respect to the bolster. While not essential for some uses, it is desirable to aid in maintaining parallelism of the side frame members to cross-connect them with a connecting rod 34, see FIG. 3.

Brackets 10ª and 10ᵇ are provided with ears or extensions in which one end of each of the drag links 36 and 40 are secured. The other ends of these links are secured to rigid brackets 38 and 42 depending from the car frame G. It is preferable to interpose resilient pads between the rods and the brackets. These pads are shown at 40ª with the drag link 40, and 36ª with the drag link 36. The resilient pads 36ª and 40ª serve the function of absorbing to some degree shocks supplied between the parts, but more importantly they allow limited relative movement between the parts so that the truck can adjust to road conditions without straining connections particularly to the car structure through the brackets 42.

Journaled on the forward ends of the side frame members 14 and 12 are the guide wheels 26 and 28, which for rail usage will be flanged in the usual manner. Similarly journaled on half axles 48 and 52 secured to the side frame members 12 and 14 at the aft position are the driving wheels 46 and 50, likewise shown flanged. Thus each side frame member is provided with a pair of longitudinally aligned wheels one of which is the guide wheel and the other a drive wheel.

At the aft end of each of the side frame members 12 and 14 is a drive motor supporting framework 62 and 64 respectively, in which any suitable form of drive motors are secured. These motors are diagrammatically illustrated at 58 and 60 and are shown connected to the respective drive wheels 46 and 50 by means of suitable transmissions 54 and 56.

At the front end of the side frame members is a cross link or tie rod 44, which is connected to lateral brackets 12ª and 14ª on the side frame members by means of any suitable form of universal joint connection as diagrammatically shown in the figures. This connecting rod provides an additional factor of safety in holding the side frame members properly spaced at that end.

It will be apparent from the above description that the side frame members are pivotally connected to the bolster and hence are capable of some relative pivotal movement with respect to each other under the guidance of the rails.

The mounting of the drive wheels close to the bolster and the supporting of the drive motors in an overhanging relation with respect thereto highly loads the drive wheels. The position of the driving wheels with respect to the bolster causes them to assume a much greater proportion of the loaded vehicle generally than is assumed by the displaced guide wheels. In some cases that division may be as high as four-fifths of the gross weight as applied to the driving wheels. In addition the motor mounting increases this loading. Thus with this arrangement a major portion of the transported weight is applied to the drive wheels so that the assembly has a higher acceleration capacity than in normally loaded trucks. The result is that two wheel drive is practical in the structure herein disclosed as distinguished from four wheel drive required when the loading on the fore and aft wheels is more or less equal.

It will be apparent to those skilled in the art that the subject matter of this invention is capable of embodiment in structures different from that specifically selected for descriptive purposes. It is anticipated, therefore, that the scope of protection afforded by a patent granted hereon shall be determined by the claims rather than by the example.

What is claimed is:

1. In a railway vehicle the combination with a railway car structure of a truck assembly comprising a pair of independent side frame members extending longitudinally of said structure and each having an upwardly extending lateral bracket, a single transversely extending bolster, pivot means connecting the ends of said bolster to said brackets for pivotal movement on vertical axes, resilient supports interposed between the ends of said bolster and said car structure, a pair of drive wheels journaled on said side frame members respectively at one end on stub axles, a pair of guide wheels journaled on said side frame members respectively at the other ends on stub axles, and a tie rod having universal joint connections to said side frame members adjacent said guide wheels.

2. In the combination of claim 1, said pivot means including turning plates located at a low level close to the top of the rails.

3. In the combination of claim 1, said driving wheels being power driven and positioned closer to said pivoting means than said guiding wheels.

4. In the combination of claim 1, said bolster having a cross-sectional shape of low torsional rigidity.

5. In the combination of claim 1, said bolster having at least its middle portion of H-shaped cross-section.

6. In the combination of claim 1, motive means operatively connected to said driving wheels and cantilever frames extending longitudinally from said side frame members respectively for supporting said motive devices.

7. In the combination of claim 1, said bolster having upwardly diverging brackets at the ends thereof forming part of said pivot means, and said resilient supports resting on the upper ends of said brackets.

8. In the combination of claim 1, drag rods connecting the ends of said bolster to said car structure.

9. In a railroad vehicle the combination with a car structure of a truck assembly comprising a pair of independently horizontally swiveling side frame members, a single supporting center frame member extending transversely of said side frame members and pivotally connected thereto, resilient supports interposed between said center frame member and the car structure, pairs of driving and guiding wheels independently journaled on said side frame members in pairs positioned at unequal distances from the center frame member, a separate motor for driving each wheel of said pair of driving wheels, and cantilever supports for said motors attached to said frame members respectively and extending outwardly of said driving wheels to increase the load on said driving wheels.

References Cited in the file of this patent
UNITED STATES PATENTS

| | | |
|---|---|---|
| 598,403 | Uebelacker | Feb. 1, 1898 |
| 761,353 | Brill et al. | May 31, 1904 |
| 767,660 | Price et al. | Aug. 16, 1904 |
| 1,020,607 | Hunt | Mar. 19, 1912 |
| 1,385,737 | Westlake | July 26, 1921 |
| 1,612,346 | Aspinwall | Dec. 28, 1926 |
| 1,935,550 | Eugster | Nov. 14, 1933 |
| 2,078,915 | Flowers | Apr. 27, 1937 |
| 2,324,943 | Miller et al. | July 20, 1943 |
| 2,620,742 | Watter | Dec. 9, 1952 |
| 2,685,846 | Gassner et al. | Aug. 10, 1954 |
| 2,908,230 | Dean | Oct. 13, 1959 |
| 2,954,747 | Hirst et al. | Oct. 4, 1960 |
| 2,977,897 | Lich | Apr. 4, 1961 |